United States Patent

Ponomarev et al.

[11] 4,075,168
[45] Feb. 21, 1978

[54] FLUOROSILOXANE DIOLS AND METHOD OF PRODUCING SAME

[76] Inventors: Alexei Ivanovich Ponomarev, prospekt Stachek, 59, korpus 2, kv. 47; Sergei Vasilievich Sokolov, ulitsa III Internatsionala, 67, kv. 222; Julia Alexeevna Larionova, prospekt Elizarova, 12, kv. 15; Tatyana Ivanovna Rymareva, bulvar Novatorov, 14, kv. 16; Alexandr Leibovich Klebansky, ulitsa Zhelyabova, 10, kv. 107, all of Leningrad; Vsevolod Volfovich Berenblit, ulitsa Nagornaya, 23, kv.10, Leningradskaya oblast, Vsevolozhsky raion, poselok Kuzmolovsky; Jury Pavlovich Dolnakov, ulitsa Narvskaya, 4, kv. 122, Leningradskaya oblast, Krasnoe selo; Lev Moiseevich Yagupolsky, ulitsa Ivana Kudri, 41, kv. 48, Kiev; Vladlen Vasilievich Malovik, ulitsa Osipovskogo, 4/5, kv. 6, Kiev; Miron Onufrievich Lozinsky, ulitsa Voroshilova, 18, kv. 13, Kiev; Viktor Mikhailovich Belous, ulitsa Ujutnaya, 5a, kv. 3, Odessa; Boris Efimovich Gruz, ulitsa Kurskaya, 10a, kv. 18, Kiev; Ljubov Antonovna Alexeeva, Proletarsky bulvar, 41, kv. 28, Odessa, all of U.S.S.R.

[21] Appl. No.: 704,924

[22] Filed: July 13, 1976

[51] Int. Cl.² .............................................. C08G 77/04
[52] U.S. Cl. ..................... 260/46.5 R; 260/46.5 UA; 260/46.5 Y; 260/448.2 R; 260/448.2 B; 260/448.2 E; 260/448.2 Q
[58] Field of Search .................. 260/46.5 R, 46.5 UA, 260/46.5 Y, 448.2 R, 448.2 B, 448.2 E, 448.2 Q

[56] References Cited

U.S. PATENT DOCUMENTS

| 2,914,544 | 12/1959 | Holbrook et al. | 260/46.5 R |
| 3,328,348 | 6/1967 | Spork | 260/46.5 R |
| 3,716,517 | 2/1973 | Pittman et al. | 260/46.5 R |

*Primary Examiner*—Melvyn I. Marquis
*Attorney, Agent, or Firm*—Haseltine, Lake & Waters

[57] ABSTRACT

The present invention relates to fluorosiloxane diols of the formula

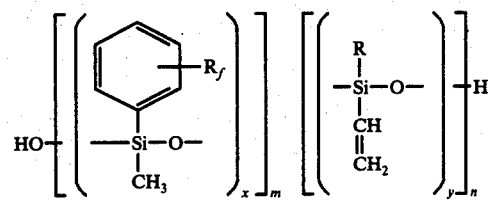

where:
$R_F$ = $OCF_3$, $OC_2F_5$, $OC_2F_4OCF_3$, $C_2F_4OCF_3$, $C_3F_7$,
$R$ = $CH_3$, $C_6H_5$,
$x = 1.0 - 0.97$,
$y = 0 - 0.03$,
$m = 2.3 - 187.2$, $'n = 0 - 3.8$ with an average molecular weight of 620 - 51,200. The invention also relates to a method of producing said compounds of the general formula (I) residing in that hydrolysis is performed on fluorosiloxanes of the general formula:

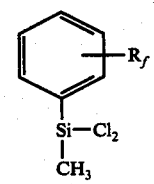

(II)

where:
$R_F$ = $OCF_3$, $OC_2F_5$, $OC_2F_4OCF_3$, $C_2F_4OCF_3$, $C_3F_7$ or of a mixture of said compounds of the general formula (II) with methyl(phenyl)vinylidichlorosilanes of the general formula:

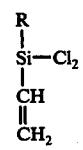

(III)

where:
R = $CH_3$, $C_6H_5$ with a mole ratio of the general formula (II) to those of the general formula (III) equal to 1-0.97 : 0-0.03, respectively, in the presence of an acceptor of hydrogen chloride liberating during hydrolysis, said hydrolysis being performed at a temperature of 0° - 25° C. The proposed fluorosiloxane diols can be used for manufacturing sealants, compounds, and rubbers possessing high thermostability, frost-, and benzine- and oil-resistance. The proposed method ensures high yield (up to 97% of theory) of the desired products.

1 Claim, No Drawings

FLUOROSILOXANE DIOLS AND METHOD OF PRODUCING SAME

The present invention relates to novel compounds, namely, fluorosiloxane diols and to a method of producing them.

The fluorosiloxane diols are, according to the invention, of the formula

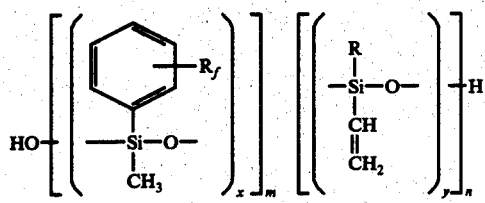

where:
$R_F$ = $OCF_3$, $OC_2F_5$, $OC_2F_4OCF_3$, $C_2F_4OCF_3$, $C_3F_7$,
R = $CH_3$, $C_6H_5$,
$x$ = 1.0 – 0.97,
$y$ = 0 – 0.03,
$m$ = 2.3 – 187.2,
$n$ = 0 – 3.8
with an average molecular weight of 620 – 51,200.

Said compounds are low-molecular (oligomeric) products. They can be used for preparing sealants, compounds, and rubbers possessing high thermostability (up to 370° – 415° C according to differential-thermal analysis), frost resistance (glass transition temperature from −71° to −65° C), benzine-oil resistance (sealants, compounds, and rubbers are insoluble in gasoline, hexane, benzene, toluene, and other non-polar solvents as well as in mineral oils). Said sealants, compounds, and rubbers are suitable for use in various fields of engineering, such as instrument making, automobile construction, aircraft construction, etc.

The proposed fluorosiloxane diols can be produced by a method residing, according to the invention, in that hydrolysis is performed of fluorosiloxanes of the formula

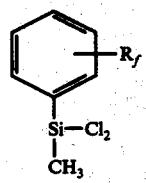 (II)

where:
$R_F$ = $OCF_3$, $OC_2F_5$, $OC_2F_4OCF_3$, $C_2F_4OCF_3$, $C_3F_7$
or a mixture of said compounds of the general formula (II) with methyl(phenyl)vinyldichlorosilanes of the formula $$\begin{array}{c} R \\ | \\ Si-Cl_2 \\ | \\ CH \\ \| \\ CH_2 \end{array}$$ (III)

where:
R = $CH_3$, $C_6H_5$ with a mole ratio of the compounds of the formula (II) to those of the general formula (III) equal to 1 – 0.97 : 0 – 0.03, respectively, in the presence of an acceptor of hydrogen chloride liberated during hydrolysis, said hydrolysis being performed at 0°–25° C.

The proposed method ensures high yield (up to 97% of theory) of the desired products.

Sodium, potassium, ammonium or lithium hydroxide, sodium bicarbonate, or pyridine can be used as acceptors of hydrogen chloride in the proposed method. The method is realized as follows. An aqueous solution of an acceptor of hydrogen chloride is put into a reactor and the fluorosiloxane methyldichlorosilane or its mixture with methyl(phenyl)vinyldichlorosilane is slowly added into the reactor. Hydrolysis is conducted at a preset temperature within the range of 0°–25° C. On completion of the hydrolysis, i.e. when the given molecular weight of the desired product is attained, the latter is isolated from the reaction mixture by known methods. The reaction mixture is treated with an extractant, for example, ether or hexafluorobenzene. An organic layer (extract) is separated from an aqueous layer, washed off from salts and dried. The extractant is evaporated and then low-boiling products are distilled off in vacuum. The distillation residue is the desired product.

For a better understanding of the present invention specific examples of its realization are given hereinbelow by way of illustration (the average quantitative values of the coefficients "$m$" and "$n$" corresponding to general formula (I) as well as of the molecular weights of the desired products are given in the Examples).

EXAMPLE 1

83 g (2.07 mole) of sodium hydroxide are put into a three-necked flask and dissolved in 340 ml of water (19.5% solution of alkali is obtained) 265.3 g (0.964 mole) of [(meta-trifluoromethoxy)phenyl]methyldichlorosilane are added for 7 hours to the alkali solution cooled down to 0°–2° C under intensive stirring. The temperature of 0°–2° C is maintained in the reaction zone during the addition of [(meta-trifluoromethoxy)-phenyl]methyldichlorosilane. After the addition of said compound the temperature is raised up to 18°–25° C and the mixture is kept at this temperature for 188 hours. Then the product of hydrolysis (the desired product) is dissolved in ether and washed off from alkali (to neutral reaction) and sodium chloride. The ether solution is dried over sodium sulphate and ether is removed from the solution. The low-boiling products are distilled from the residue under vacuum (2 mm Hg) at 150°– 160° C. 194.4 g (95% yield of theory) of poly-{[meta-trifluoromethoxy)phenyl]methylsiloxane}-α, ω-diols are obtained of the general formula (I), where $R_F$ = $OCF_3$; $x$ = 1.0; $y$ = 0; $m$ = 140.5 and $n$ = 0. The average molecular weight of the product is 31.020.

Elemental Analysis

Found, %: C, 43.42; H, 3.23; Si, 12.94; F, 26.10; OH, 0.12.

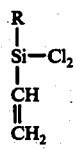 

Calculated, %: C, 43,63; H, 3.18; Si, 12.72; F, 25.90; OH, 0.11.

The poly-{[(meta-trifluoromethoxy)phenyl]methyl-siloxane}-α,ω-diols obtained have the following properties:

1) insolubility in gasoline, hexane, benzene, mineral oils;
2) high solubility in polar solvents, for example, ethylacetate, acetone, ether, hexafluorobenzene;
3) glass transition temperature is (−74)° C;
4) temperature of the beginning of oxidation in air, according to differential thermal analysis (DTA) is 415° C.

EXAMPLE 2

88 g (2.2 mole) of sodium hydroxide are put into a flask and dissolved in water until 19.5% solution is obtained. A mixture of 266.7 g (0.97 mole) of (meta-trifluoromethoxy)phenyl methyldichlorosilane and 4.2 g (0.03 mole) of methylvinyldichlorosilane is added for 8 hours to the alkali solution cooled down to 0°-2° under intensive stirring. The temperature 0°-2° is maintained in the reaction zone during the addition of said mixture. After the addition the temperature is raised up to 18° - 25° and the reaction mixture is kept at this temperature for 25 hours.

The desired product is isolated from the reaction mixture by following the procedure described in Example 1. 198.5 g (92% yield of theory) of poly-{[(meta-trifluoromethoxyphenyl]methylsiloxane}-α,ω-diols are obtained of the general formula (I), where $R_F$ = $OCF_3$. R = $CH_3$; $x$ = 0.97; $y$ = 0.03; $m$ = 20.3; $n$ = 0.6. The average molecular weight is 4,520.

Elemental Analysis

Found, %: C, 43.75; H, 3.44; Si, 13.15; F, 25.73; OH, 0.68; $CH_2$ = CH, 0.12.

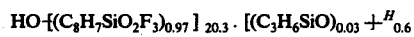

Calculated, %: C, 43.61; H, 3.22; Si, 13.00; F, 25.60; OH, 0.75; $CH_2$ = CH, 0.12.

Poly-{[(meta-trifluoromethoxy)phenyl]methylsiloxane}-α,ω-diols obtained have the following properties:
1) insolubility in gasoline, hexane, benzene, and mineral oils;
2) high solubility in polar solvents, for example, hexafluorobenzene, freons, acetone, ethylacetate, and ether;
3) glass transition temperature is (−75.3)° C;
4) temperature of the beginning of oxidation in air according to DTA is 406° C.

EXAMPLE 3

193.3 g (88% yield of theory) of poly-{[(para-trifluoromethoxy)phenyl]methylsiloxane}-α,ω-diols of the general formula (I), where $R_F$ = $OCF_3$; R = $CH_3$; $x$ = 0.997; $y$ = 0.003; $m$ = 9.97, and $n$ = 0.03, are obtained by following the procedure described in Example 2 from 274.2 g (0.997 mole) of [(para-trifluoromethoxy)phenyl]methyldichlorosilane and 0.43 g (0.003 mole) of methylvinyldichlorosilane at 0°-2° in the presence of 77 g (2.2 mole) of ammonium hydroxide in the form of 10% aqueous solution the reaction mixture obtained being kept at 18° C for 3 hours. The average molecular weight is 2,190.

Elemental Analysis

Found, %: C, 43.51; H, 3.12; Si, 12.82; F, 25.75; OH, 1.48; $CH_2$ = CH, 0.03.

Calculated, %: C, 43.63; H, 3.18; Si, 12.70; F, 25.90; OH, 1.55; $CH_2$ = CH, 0.03.

Poly-{[(para-trifluoromethoxy)phenyl]methylsiloxane}-α,ω-diols obtained have the following properties:
1) insolubility in gasoline, hexane, benzene, and mineral oils;
2) high solubility in polar solvents, for example, ethylacetate, acetone, and hexafluorobenzene;
3) glass transition temperature is (−51.5)° C;
4) temperature of the beginning of oxidation in air, according to DTA, is 375° C.

EXAMPLE 4

258.6 g (97% of theory) of poly-{[(meta-pentafluoroethoxy)phenyl]methylsiloxane}-α,ω-diols of the general formula (I), where $R_F$ = $OC_2F_5$; R = $C_6H_5$; $x$ = 0.98; $y$ = 0.02; $m$ = 187.2; and $n$ = 3.8, are obtained by following the procedure described in Example 2 from 318 g (0.98 mole) of [(meta-pentafluoroethoxy)phenyl]methyldichlorosilane and 4.1 g (0.02 mole) of phenylvinyldichlorosilane at 0° - 2° in the presence of 123.3 g (2.2 mole) of potassium hydroxide in the form of 20% aqueous solution, the reaction mixture obtained being kept at 18° - 25° for 200 hours. The average molecular weight is 51,200.

Elemental Analysis

Found, %: C, 40.42; Si, 10.62; F, 35.51; OH, 0.05; $CH_2$=CH, 0.22.

Calculated, %: C, 40.37; Si, 10.49; F, 35.20; OH, 0.06; $CH_2$=CH, 0.20.

Poly{[(meta-pentafluoroethoxy)phenyl]methylsiloxane}-α,ω-diols obtained have the following properties:
1) insolubility in gasoline, benzene, hexane, toluene, and mineral oils;
2) high solubility in polar solvents, for example, ethylacetate, hexafluorobenzene, benzotrifluoride, and hexafluoroxylene;
3) glass transition temperature is (−48)° C;
4) temperature of the beginning of oxidation in air, according to DTA, is 368° C.

EXAMPLE 5

95.5 g (1.05 mole) of pyridine in 770 ml of water (19.5% pyridine solution) are put into a three-necked flask. 162.5 g (0.5 mole) of [(para-pentafluoroethoxy)phenyl]methyldichlorosilane are added for 10 hours to the aqueous solution of pyridine cooled to 2°-5° C under intensive stirring. The temperature 2°-5° C is maintained in the reaction zone when [(para-pentafluoroethoxy)phenyl]methyldichlorosilane is added. After hydrolysis is completed, the isolation of the desired product is performed by following the procedure described in Example 1, hexafluorobenzene being used as the extractant. 114.7 g (85% yield of theory) of poly{[(para-pentafluoroethoxy)phenyl methylsiloxane}-α,ω-diols are obtained of the general formula (I), where $R_F$ = $OC_2F_5$; $x$ = 1.0; $y$ = 0; $m$ = 2.3; $n$ = 0. The average molecular weight is 620.

Elemental Analysis

Found, %: C, 40.16; Si, 10.47; F, 35.38; OH, 5.56.

Calculated, %: C, 40.0; Si, 10.37; F, 35.19; OH, 5.48.

Poly{[(para-pentafluoroethoxy)phenyl]methylsiloxane}-α,ω-diols obtained have the following properties:
1) insolubility in gasoline, benzene, hexane, toluene, and mineral oils;
2) high solubility in polar solvents, for example, ethylacetate, benzotrifluoride, and hexafluoroxylene;
3) glass transition temperature is (−24)° C;
4) temperature of the beginning of oxidation in air, according to DTA, is 356° C.

EXAMPLE 6

99 g (90% yield of theory) of poly-{[(ortho-trifluoromethoxy)phenyl]-methylsiloxane-α,ω-diols of the general formula (I), where $R_F = OCF_3$; $x = 1.0$; $y = 0$; $m = 4$; $n = 0$, are obtained by following the procedure described in Example 5 from 137.3 g (0.499 mole) of [(ortho-trifluoromethoxy)phenyl]methyldichlorosilane at 15° in the presence of 92.4 g (1.098 mole) of sodium bicarbonate in the form of 5% aqueous solution. The average molecular weight is 882.

Elemental Analysis

Found, %: C, 43.76; H, 3.28; Si, 12.84; F, 26.12; OH, 3.92

Calculated, %: C, 43.63; H, 3.18; Si, 12.72; F, 25.90; OH, 3.85.

Poly{[(ortho-trifluoromethoxy)phenyl]methylsiloxane}-α,ω-diols obtained have the following properties:
1) insolubility in gasoline, hexane, benzene, and mineral oils;
2) high solubility in polar solvents, for example, ethylacetate, acetone, diethyl ether, hexafluorobenzene;
3) glass transition temperature is (−47)° C;
4) temperature of the beginning of oxidation in air, according to DTA, is 375° C.

EXAMPLE 7

159.2 g (95% yield of theory) of poly-{[(meta-perfluoro-1,4-dioxamyl)phenyl]methylsiloxane}-α,ω-diols of the general formula (I), where $R_F = OC_2F_4OCF_3$; R = $C_6H_5$; $x = 0.99$; $y = 0.01$; $m = 29.9$; $n = 0.3$, are obtained by following the procedure described in Example 2 from 195.1 g (0.495 mole) of [(meta-perfluoro-1,4-dioxamyl)phenyl]methyldichlorosilane of the formula

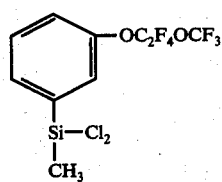

(IV)

and 1.0 g (0.005 mole) of phenylvinyldichlorosilane at 0°–2° C in the presence of 26.3 g (1.1 mole) of lithium hydroxide in the form of 10% aqueous solution the reaction mixture obtained being kept at 18°–20° for 60 hours. The average molecular weight is 10,100.

Elemental Analysis

Found, %: C, 36.16; Si, 8.52; F, 40.04; OH, 0.35; CH$_2$=CH, 0.10.

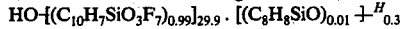

Calculated, %: C, 35.93; Si, 8.36; F, 39.82; OH, 0.33; CH$_2$=CH, 0.08.

Poly-{[(meta-perfluoro-1,4-dioxamyl)phenyl]methylsiloxane}-α,ω-diols have the following properties:
1) insolubility in benzene, hexane, toluene, gasoline, and mineral oils;
2) high solubility in polar solvents, for example, ethyl acetate, ether, hexafluorobenzene, freons, benzotrifluoride, and hexafluoroxylene;
3) glass transition temperature is (−69)° C;
4) temperature of the beginning of oxidation in air, according to DTA, is 402° C.

EXAMPLE 8

150.3 g (89.5% yield of theory) of poly-{[(meta-perfluoro-1,4-dioxamyl)phenyl]methylsiloxane}-α,ω-diols of the general formula (I), where $R_F = OC_2F_4OCF_3$; $x = 1.0$; $y = 0$; $m = 3.5$; $n = 0$, are obtained by following the procedure described in Example 5 from 195.6 g (0.5 mole) of [(meta-perfluoro-1,4-dioxamyl)phenyl]methyldichlorosilane at 5°–8° C in the presence of 26.2 g (1.1 mole) of lithium hydroxide in the form of 10% aqueous solution. The average molecular weight is 1,180.

Elemental Analysis

Found, %: C, 35.91; Si, 8.46; F, 40.12; OH, 2.82.

Calculated, %: C, 35.71; Si, 8.33; F, 39.55; OH, 2.88.

Poly-{[(meta-perfluoro-1,4-dioxamyl)phenyl]methylsiloxane}-α,ω-diols obtained possess the properties similar to those described in Example 7.

EXAMPLE 9

220 g (86% yield of theory) of poly-{[(meta-perfluoro-3-oxabutyl)phenyl]methylsiloxane}-α,ω-diols of the general formula (I), where $R_F = C_2F_4OCF_3$; $x = 1.0$; $y = 0$; $m = 32$; $n = 0$, are obtained by following the procedure described in Example 1 from 300 g (0.8 mole) of [(meta-perfluoro-3-oxabutyl)phenyl]methyldichlorosilane of the formula

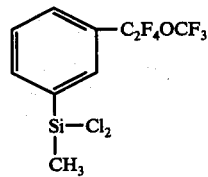

(V)

at 0°–2° C in the presence of 70.4 g (1.76 mole) of sodium hydroxide in the form of 19.5% aqueous solution the reaction mixture obtained being kept at 15° C for 35 hours. The average molecular weight is 10,250.

Elemental Analysis

Found, %: C, 37.67; Si, 8.62; F, 41.12; OH, 0.32.

Calculated, %: C, 37.50; Si, 8.75; F, 41.25; OH, 0.33.

Poly-{[(meta-perfluoro-3-oxabutyl)phenyl]-methylsiloxane}-α,ω-diols obtained having the following properties:

1) insolubility in benzene, hexane, toluene, gasoline, and mineral oils;
2) high solubility in polar solvents, for example, ethylacetate, hexafluorobenzene, ether, freons, and hexafluoroxylene;
3) glass transition temperature is $(-68)°$ C;
4) temperature of the beginning of oxidation in air, according to DTA, is 405° C.

EXAMPLE 10

69.1 g (91% yield of theory) of poly-{[(meta-heptafluoropropyl)phenyl]methylsiloxane}-$\alpha,\omega$-diols of the general formula (I), where $R_F = C_3F_7$; $x = 1.0$; $y = 0$; $m = 60.8$; $n = 0$, are obtained by following the procedure described in Example 1 from 89.7 g (0.25 mole) of [(meta-heptafluoropropyl)phenyl]-methyldichlorosilane at 4°-5° C in the presence of 22 g (0.55 mole) of sodium hydroxide in the form of 19.5% aqueous solution, the reaction mixture obtained being kept at 18°-20° for 35 hours. The average molecular weight is 18,500.

Elemental Analysis

Found, %: C, 39.52; Si, 9.35; F, 43.84; OH, 0.21.

Calculated, %: C, 39.47; Si, 9.21; F, 43.75; OH, 0.18.
Poly-{[(meta-heptafluoropropyl)phenyl]-methylsiloxane}-$\alpha,\omega$-diols obtained have the following properties:
1) insolubility in benzene, toluene, hexane, gasoline, and mineral oils;
2) high solubility in polar solvents, for example, ethylacetate, hexafluorobenzene, hexafluoroxylene, ether, and benzotrifluoride;
3) glass transition temperature is $(-44)°$ C;
4) temperature of the beginning of oxidation in air, according to DTA, is 365° C.

EXAMPLE 11

106.7 g (97% yield of theory) of poly-{[(meta-trifluoromethoxy)phenyl]methylsiloxane}-$\alpha,\omega$-diols of the general formula (I), where $R_F = OCF_3$; $R = C_6H_5$; $x = 0.998$; $y = 0.002$; $m = 27.94$; $n = 0.06$, are obtained by following the procedure described in Example 2 from 137.2 g (0.499 mole) of [(meta-trifluoromethoxy)phenyl]methyldichlorosilane and 0.205 g (0.001 mole) of phenylvinyldichlorosilane at 2°-4° C in the presence of 44 g (1.1 mole) of sodium hydroxide in the form of 19.5% aqueous solution, the reaction mixture obtained being kept at 20° C for 85 hours. The average molecular weight is 6,200.

Elemental Analysis

Found, %: C, 43.42; Si, 12.62; F, 25.84; OH, 0.57; CH=CH$_2$,0.026.

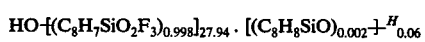

Calculated, %: C, 43.24; Si, 12.73; F, 25.67; OH, 0.55; CH=CH$_2$, 0.024.
Poly-{[(meta-trifluoromethoxy)phenyl]methylsiloxane}-$\alpha,\omega$-diols obtained possess the properties similar to those described in Example 2.

EXAMPLE 12

251.8 g (94% yield of theory) of poly-{[(meta-pentafluoroethoxy)phenyl]methylsiloxane}-$\alpha,\omega$-diols of the general formula (I), where $R_F = OC_2F_5$; $R = CH_3$; $x = 0.99$; $y = 0.01$; $m = 31.1$; $n = 0.3$, are obtained by following the procedure described in Example 2 from 321.7 g (0.99 mole) of (meta-pentafluoroethoxy)phenyl methyldichlorosilane and 1.42 g (0.01 of methylvinyldichlorosilane at 0°-2° in the presence of 88 g (2.2 mole) of sodium hydroxide in the form of 19.5% aqueous solution, the reaction mixture obtained being kept at 20° C for 96 hours. The average molecular weight is 8,420.

Elemental Analysis

Found, %: C, 40.52; Si, 10.64; F, 35.14; OH, 0.43; CH=CH$_2$, 0.09.

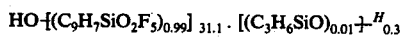

Calculated, %: C, 40.30; Si, 10.49; F, 35.16; OH, 0.41; CH=CH$_2$, 0.10.
Poly-{[(meta-pentafluoroethoxy)phenyl]methylsiloxane}-$\alpha,\omega$-diols obtained have the properties similar to those described in Example 4.

EXAMPLE 13

30.3 g (90% yield of theory) of poly-{[(metal-perfluoro-1,4-dioxamyl)phenyl]methylsiloxane}-$\alpha,\omega$-diols of the general formula (I), where $R_F = OC_2F_4OCF_3$; $R = CH_3$; $x = 0.99$; $y = 0.01$; $m = 49.5$; $n = 0.5$, are obtained by following the procedure described in Example 2 from 38.7 g (0,009 mole) of [(meta-perfluoro-1,4-dioxamyl)phenyl]methyldichlorosilane and 0.14 g (0.001 mole) of methylvinyldichlorosilane at 0°-2° in the presence of 12.3 g (0.11 mole) of potassium hydroxide in the form of 19.5% aqueous solution, the reaction mixture obtained being kept at 20° C for 120 hours. The average molecular weight is 16,650.

Elemental Analysis

Found, %: C, 35.85; Si, 8.65; F, 39.84; OH, 0.20; CH=CH$_2$, 0.09.

Calculated, %: C, 35.71; Si, 8.33; F, 39.55; OH, 0.20; CH=CH$_2$, 0.08.
Poly-{[(meta-fluoro-1,4-dioxamyl)phenyl]-methylsiloxane}-$\alpha,\omega$-diols obtained possess the properties similar to those described in Example 7.

EXAMPLE 14

28.0 g (89% yield of theory) of poly-{[(meta-perfluoro-3-oxabutyl)phenyl]methylsiloxane}-$\alpha,\omega$-diols of the general formula (I), where $R_F = C_2F_4OCF_3$; $R = CH_3$; $x = 0.98$; $y = 0.02$; $m = 68.6$; $n = 1.4$, are obtained by following the procedure described in Example 2 from 36.9 g (0.098 mole) of [(meta-perfluoro-3-oxabutyl)phenyl]methyldichlorosilane and 0.3 g (0.002 mole) of methylvinyldichlorosilane at 2°-4° C in the presence of 8.8 g (0.22 mole) of sodium hydroxide in the form of 19.5% aqueous solution, the reaction mixture obtained being kept at 20° C for 150 hours. The average molecular weight is 22,050.

Elemental Analysis

Found, %: C, 38.21; Si, 9.12; F, 42.34; OH, 0.14; CH=CH$_2$, 0.15.

Calculated, %: C, 38.09; Si, 8.88; F, 42.22; OH, 0.15; CH=CH$_2$, 0.17.

Poly-{[(meta-perfluoro-3-oxabutyl)phenyl[methylsiloxane]-α,ω-diols possess the properties similar to those described in Example 9.

EXAMPLE 15

27.8 g (91% yield of theory) of poly-{[(meta-perfluoro-3-oxabutyl)phenyl]methylsiloxane}-α,ω-diols of the general formula (I), where $R_F = C_2F_4OCF_3$; R = $C_6H_5$; $x = 0.98$; $y = 0.02$; $m = 78.4$; $n = 1.6$, are obtained by following the procedure described in Example 2 from 36.85 g (0.098 mole) of [(meta-perfluoro-3-oxabutyl)phenyl]methyldichlorosilane and 0.4 g (0.002 mole) of phenylvinyldichlorosilane at 4°–6° C in the presence of 8.85 g (0.22 mole) of sodium hydroxide in the form of 19.5% aqueous solution the reaction mixture obtained being kept at 16° C for 180 hours. The average molecular weight is 25.280.

Elemental Analysis

Found, %: C, 38.21; Si, 8.92; F, 42.36; OH, 0.13; CH=CH$_2$, 0.16.

Calculated, %: C, 38.00; Si, 8.80; F, 42.12; OH, 0.13; CH=CH$_2$, 0.17.

Poly-{[(meta-perfluoro-3-oxabutyl)phenyl]methylsiloxane}-α,ω-diols obtained have the properties similar to those described in Example 9.

EXAMPLE 16

28.1 g (94% yield of theory) of poly-{[(meta-heptafluoropropyl)phenyl]methylsiloxane}-α,ω-diols of the general formula (I), where $R_F = C_3F_7$; R = $C_6H_5$; $x = 0.97$; $y = 0.03$; $m = 63.0$; $n = 2.0$, are obtained by following the procedure described in Example 2 from 34.8 g (0.097 mole) of [(meta-heptafluoropropyl)phenyl]methyldichlorosilane and 0.6 g (0.003 mole) of vinylphenyldichlorosilane at 0°–2° C in the presence of 5.3 g (0.22 mole) of lithium hydroxide in the form of 10% aqueous solution, the reaction mixture obtained being kept at 20° C for 175 hours. The average molecular weight is 19.435.

Elemental Analysis

Found, %: C, 40.31; Si, 9.54; F, 44.62; OH, 0.17; CH=CH$_2$, 0.25.

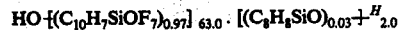

Calculated, %: C, 40.14; Si, 9.37; F, 44.48; OH, 0.17; CH=CH$_2$, 0.27.

Poly-{[(meta-heptafluoropropyl)phenyl]-methylsiloxane}-α,ω-diols obtained possess the properties similar to those described in Example 10.

EXAMPLE 17

288.3 g (95% yield of theory) of poly-{[(meta-heptafluoropropyl)phenyl]methylsiloxane}-α,ω-diols of the general formula (I), where $R_F = C_3F_7$; R = CH$_3$; $x = 0.998$; $y = 0.002$; $m = 35.9$; $n = 0.1$, are obtained by following the procedure described in Example 2 from 358.3 g (0.998 mole) of (meta-heptafluoropropyl)phenyl methyldichlorosilane and 0.3 g (0.002 mole) of methylvinyldichlorosilane at 0°–2° C in the presence of 184.8 g (2.2 mole) of sodium bicarbonate in the form of aqueous solution, the reaction mixture obtained being kept at 18°–20° for 96 hours. The average molecular weight is 10,920.

Elemental Analysis

Found, %: C, 39.71; Si, 9.35; F, 44.06; OH, 0.31; CH=CH$_2$, 0.05.

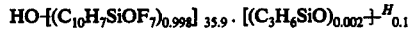

Calculated, %: C, 39.60; Si, 9.24; F, 43.89; OH, 0.31; CH=CH$_2$, 0.06.

Poly-{[(meta-heptafluoropropyl)phenyl]methylsiloxane}-α,ω-diols obtained possess the properties similar to those described in Example 10.

What is claimed is:

1. Fluorosiloxane diols of the formula

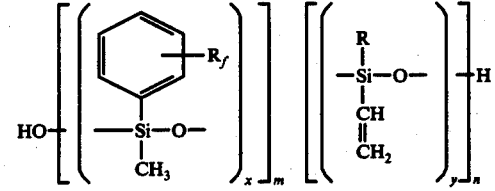

where:
$R_F = OCF_3, OC_2F_5, OC_2F_4OCF_3, C_2F_4OCF_3, C_3F_7$,
R = CH$_3$, C$_6$H$_5$,
$x = 1.0 - 0.97$,
$y = 0 - 0.03$,
$m = 2.3 - 187.2$
$n = 0 - 3.8$
with an average molecular weight of 620 – 51,200.

* * * * *